United States Patent [19]

Konopka

[11] Patent Number: 4,967,335

[45] Date of Patent: Oct. 30, 1990

[54] SATURABLE TRANSFORMER REGULATOR FOR FLYBACK POWER SUPPLY

[75] Inventor: John G. Konopka, Barrington, Ill.

[73] Assignee: Zenith Electronics Corp., Glenview, Ill.

[21] Appl. No.: 410,768

[22] Filed: Sep. 21, 1989

[51] Int. Cl.⁵ .................... H02P 13/00; H02M 3/335
[52] U.S. Cl. ........................................ 363/82; 363/21; 363/53; 363/91
[58] Field of Search .................... 363/55-56, 363/75, 82, 90, 91, 92, 93, 126, 20, 21, 97, 52-53

[56] References Cited

U.S. PATENT DOCUMENTS

| | | | |
|---|---|---|---|
| 1,834,416 | 12/1931 | Osgood | 363/82 |
| 2,843,818 | 7/1958 | Mintz et al. | 363/91 |
| 3,048,767 | 8/1962 | Smeltzer | 363/91 |
| 3,076,131 | 1/1963 | Weil | 363/91 |
| 3,134,067 | 5/1964 | Ervin | 363/53 |
| 4,419,723 | 12/1983 | Wilson, Jr. | 363/21 |
| 4,447,866 | 5/1984 | Reeves | 363/21 |
| 4,451,876 | 5/1984 | Ogata | 363/21 |
| 4,658,341 | 4/1987 | Felps | 363/21 |
| 4,811,187 | 3/1989 | Nakajima et al. | 363/91 |

Primary Examiner—Peter S. Wong

[57] ABSTRACT

A flyback type power supply has a nominal 12 volt secondary winding that is connected to a rectifier through the primary winding of a saturable transformer. The secondary winding of the saturable transformer is connected in series with the DC load current supplied by the rectifier. A filter capacitor completes the circuit. Under no load conditions, the impedance presented by the primary of the saturable transformer is high and the output voltage developed across the filter capacitor is maintained at about 12.25 volts. Under full load conditions, the impedance presented is negligible.

6 Claims, 1 Drawing Sheet

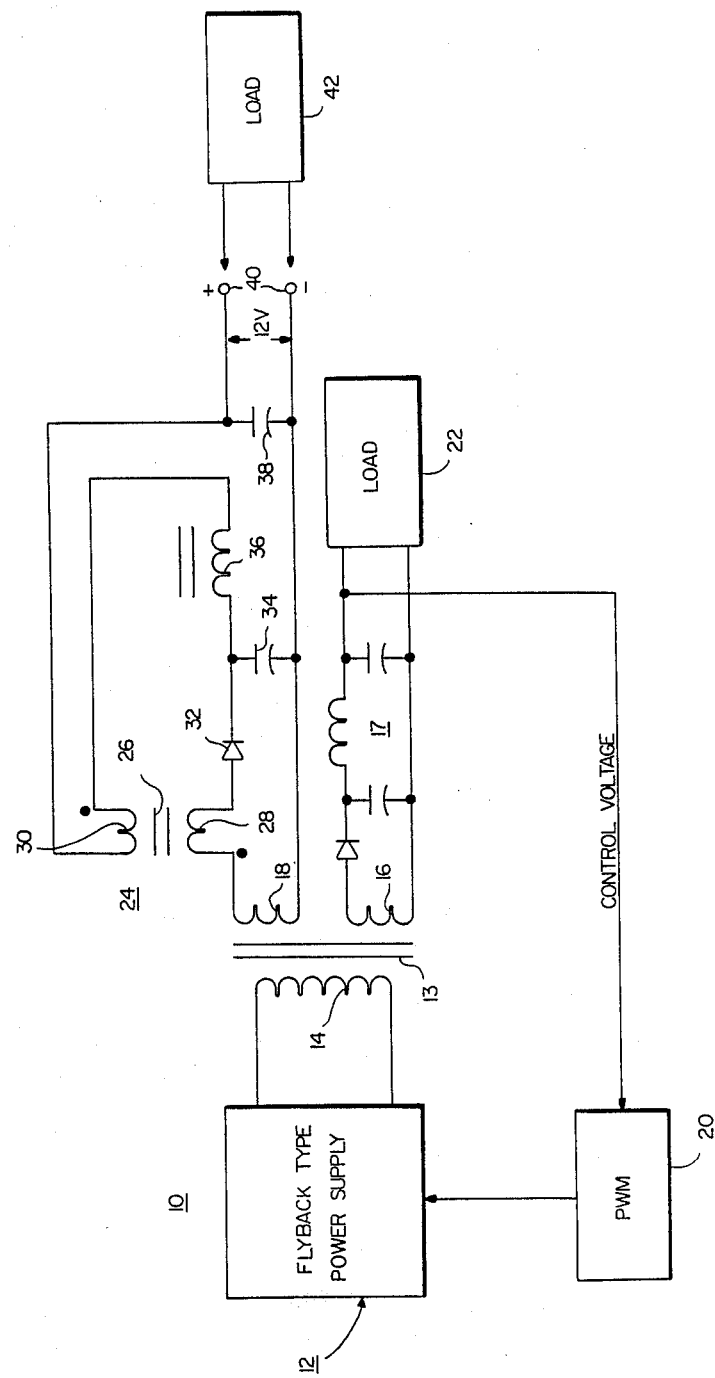

SATURABLE TRANSFORMER REGULATOR FOR FLYBACK POWER SUPPLY

BACKGROUND OF THE INVENTION AND PRIOR ART

This invention relates in general to low cost flyback type power supplies and in particular to a novel apparatus for providing a low voltage regulated flyback power supply at minimal cost.

Flyback type power supplies are well known in the art and extensively used because of their low cost and light weight. The drawback of a flyback supply is that it only delivers energy when the flyback switch is open which makes the task of controlling the output voltage more difficult. In many computer related circuits, the nominal 5 volt winding of the flyback transformer is heavily regulated whereas the nominal 12 volt winding may not be. In such instance, the output voltage across the filter capacitor in the 12 volt supply may rise to 13.3 volts or more under no load conditions. This is not desirable and is generally countered by adding a bleed resistor across the capacitor or by using a linear voltage regulator in the 12 volt supply line. The bleed resistor wastes power and generates heat and does not represent a desirable solution, especially in a compact, low cost power supply. The linear regulator is similarly neither a size or a cost effective solution.

With the present invention, a small saturable transformer is used to preclude the usual voltage rise at the output of the power supply under no load conditions and yet not inhibit full energy transfer under load conditions. While the invention is particularly useful in small flyback type power supplies, it may be advantageous used with other power supplies having similar topologies.

OBJECTS OF THE INVENTION

A principal object of the invention is to provide a novel low cost regulated power supply.

Another object of the invention is to provide a low cost regulated power supoply that controls output voltage under no load conditions while imposing minimal loss under full load conditions.

BRIEF DESCRIPTION OF THE DRAWING

These and other objects and advantages of the invention will be apparent upon reading the following description in conjunction with the drawing, the single figure of which is a partial schematic diagram of a flyback power supply regulator constructed in accordance with the invention.

DESCRIPTION OF THE PREFERRED EMBODIMENT

Referring to the drawing, a flyback power supply is generally designated by the reference character 10. A flyback type transformer 12 includes a core 13, a primary winding 14 and two secondary windings 16 and 18. Secondary winding 16 is connected to a conventional rectifier means 17, the output of which is regulation by a pulse width modulator 20. The output of rectifier means 17 is connected to a load 22. Secondary winding 18 is connnected to one end of a primary winding 28 of a saturable transformer 24 that also includes a magnetically saturable core 26 and a secondary winding 30. The other end of primary winding 28 is connected to the anode of a diode 32, the cathode of which is connected to the junction of a filter capacitor 34 and a filter choke 36. The other end of filter choke 36 is connected, through secondary winding 30 of saturable transformer 24, to the positive one of output load terminals 40. Windings 28 and 30 of saturable transformer 24 are poled as indicated by the dots. Another filter capacitor 38 is connected across the positive and negative output load terminals 40. A load circuit 42 is coupled across output terminals 40. As indicated, the nominal voltage across output load terminals 40 is 12 volts.

In operation, power supply 10 is switched at the supply switching frequency to provide a pulsed current through primary winding 14 which induces voltages in secondary windings 16 and 18. Under no load conditions, very little current flows through secondary winding 30 of saturable transformer 24 and the impedance presented by primary winding 28 is relatively high. Consequently, andy voltage spikes existing across secondary winding 18 are suppressed and don not appear across the output load terminals 40. The peak voltage developed across capacitor 38 is also lower because of the impedance of the saturable transformer. As load current flows, it passes through secondary winding 30 of saturable transformer 24. This current is DC and core 26 is selected to saturate at a low load current levels. When core 26 saturates, essentially zero impedance is imposed by primary winding 28, and consequently, the saturable transformer 24 is effectively removed from the circuit under full load conditions.

In practice, the saturable transformer used in a nominal 12 volt supply winding has a five turn primary an a one turn secondary. Its primary inductance is 80 microhenrys. It will be appreciated however that the acutal component values selected will depend upon the particular application and that these figures are representatives of the saturable transformer utilized in the preferred embodiment of the invention. The invention is to be limited only as defined in the claims.

What is claimed is:

1. In combination with a power transformer having a secondary winding;
   an output filter capacitor;
   rectifier means coupled between said secondary winding and said output filter capacitor developing a peak output voltage across said output filter capacitor that rises to undesirable levels under no load conditions; and
   saturable transformer means connected between said secondary winding and said rectifier means for automatically compensating for said rise in peak voltage under no load conditions and for imposing minimal voltage drop across said saturable transformer means under full load conditions.

2. The combination of claim 1 wherein said saturable transformer means includes a transformer having a first winding connected between said secondary winding and said redtifier means and a second winding traversed by DC current from said rectifier means.

3. The combination of claim 2 wherein said power transformer is of the flyback type.

4. The combination of claim 3 wherein said rectifier means includes a diode having first and second terminals, and wherein said first winding is connected to said first terminal of said diode and said second winding connected between said second terminal of said diode and said output filter capacitor.

5. A self-regulating flyback transformer power supply comprising:
- a flyback transformer secondary winding;
- a saturable transformer having first and second windings;
- a filter capacitor;
- a diode having first and second terminals, said first terminal being connected to said secondary winding through said first winding of said saturable transformer and said second terminal being connected to said filter capacitor through said second winding of said saturable transformer.

6. The power supply of claim 5 wherein the inductance of said saturable transformer primary winding is approximately 80 microhenrys under no load conditions and substantially 0 microhenrys under full load conditions.

* * * * *